Jan. 4, 1966  A. L. SCOTT ETAL  3,226,805
METHOD OF MAKING A STRAIN INSULATOR
Filed April 16, 1964
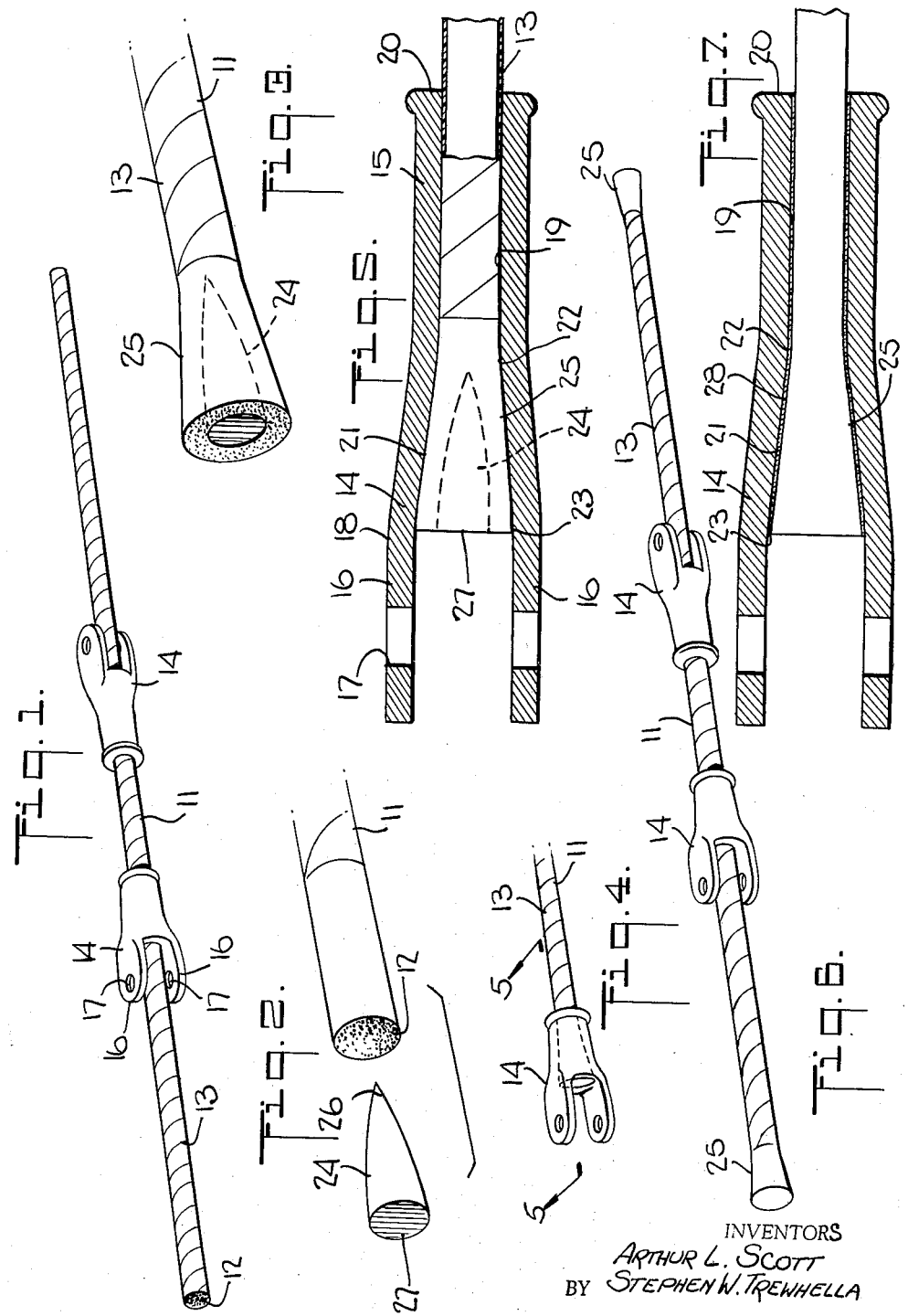
INVENTORS
ARTHUR L. SCOTT
BY STEPHEN W. TREWHELLA
ATTORNEYS

United States Patent Office 3,226,805
Patented Jan. 4, 1966

3,226,805
METHOD OF MAKING A STRAIN INSULATOR
Arthur L. Scott and Stephen W. Trewhella, both of Columbia, S.C., assignors to Columbia Products Company, Columbia, S.C., a corporation of South Carolina
Filed Apr. 16, 1964, Ser. No. 360,228
1 Claim. (Cl. 29—155.52)

This invention relates to strain insulators for use in connection with power transmission lines, towers or the like and the method of making the same and particularly to those in which the high strength of fiber glass in tension is utilized.

One of the objects of the invention is to provide a strain insulator utilizing fiber glass as a tension member in a novel manner.

Another object of the invention is to provide such a strain insulator in which the full potential of the high tensile strength of the fiber glass is utilized.

Another object is to provide such a strain insulator with suitable coupling members in which damage to the fiber glass tension member is eliminated.

Another object is to provide such a strain insulator which may be made simply and inexpensively.

Another object of the invention is to provide a novel method of making such a strain insulator.

Another object is to provide such a method which assures a product capable of utilizing the full potential of the glass fibers in tension while minimizing damage thereto.

Another object is to provide such a method which is easy to practice with a minimum of expense.

Other objects and advantages of the invention will be apparent from a consideration of the following specification and the accompanying drawings which describe and show a form of the strain insulator and method for producing the same which exemplify the invention and have proven themselves highly satisfactory, and in which:

FIG. 1 is a perspective view illustrating one of the steps involved in carrying out the invention;

FIG. 2 is a perspective, exploded view illustrating an additional step involved in practicing the method;

FIG. 3 is a perspective view of one end of the tension member after a suitable plug has been inserted therein;

FIG. 4 is a perspective view of one of the completed tension member.

FIG. 5 is a cross section view of one end of the strain insulator during processing;

FIG. 6 is a perspective view showing a step in the carrying out of the method; and FIG. 7 is a longitudinal view of a cross section of one end of the strain insulator.

Because fiber glass has suitable dielectric and insulating properties and high tensile strength, it offers advantages in the manufacture of strain insulators. However, in order to develop the full potential of fiber glass, it is desirable to have the fibers so disposed that each can assume its full shart of the burden. Furthermore, since the glass fibers are formed into a tension member and held in position by suitable resins and neither the fibers nor the resins have mechanical properties making it possible to utilize them as connectors, it is desirable to provide metal connecting members and it is important to arrange the connecting members so that they will not damage either the fibers or resins of the tension members.

The present invention is such that each of the fibers can develop its full potential while the tension member is so disposed and connected to its terminal connecting members that the application of tension to the insulator will not result in damage.

In carrying out the present invention, a plurality of glass fibers each coated with a suitable uncured or unset bonding resin are formed into a straight rod. The glass fibers all extend longitudinally and parallel to one another. A wrapping, such as a strip of cellophane, is applied spirally to compact and hold the fibers in rod form.

A suitable fitting is provided for each end of the rod. Each fitting has a bore which has a portion thereof tapering from an inner end, which is substantially the size of the rod, toward its outer end.

Each end of the rod is inserted into the inner end of a bore of such a fitting and preferably on through the fitting so that it extends beyond the outer end of the fitting. Thereafter, the cellophane wrap is removed from so much of the end of the rod as is intended to be within the fitting in the finished product and a tapered plug is inserted centrally in the fibers of the end of the rod. The fibers at the end are thus splayed out and are disposed uniformly around the tapered plug which will be joined to the fibers when the resin thereon is set, which is usually accomplished by heating.

The fittings are then moved outwardly so that the splayed-out portions of the fibers with the tapered plug centrally disposed therein are seated in the tapered portion in the bore of the fitting. The plug is so shaped and is of a size to, along with the surrounding fibers, fill the tapered portion of the bore. When the tapered portion of the bore is straight, the plug is preferably one having a longitudinal cross section of elliptical form.

When the splayed-out fibers are thus seated in the tapered portion of the bore and fitting therein, pressure is applied inwardly on the outer end of the plug and outwardly on the fitting to seat the splayed-out portions of the fibers firmly in the tapered portions of the bores and make them conform to the shape of said tapered portion with the fibers all lying straight and parallel to one another in the tapered portion of the fitting.

While the pressure is thus maintained, heat is applied to the glass fibers and the resin surrounding them causing the resin to harden and set. The result is that each of the fibers is thus straight and parallel to all of the others between the splayed-out portions which bend slightly outward from the axis of the rod into intimate contact with the inner surfaces of the tapered portions of the bores in the fittings which thus serve as molds for forming the ends of the rods with tapered portions conforming closely to the tapered bores. Each of the fibers in the tension member is fully extended and positioned to assume its share of the burden in the finished product. The flared-out portions of the fiber glass member are provided with a gentle bend but constitute direct relatively straight extensions of the straight fibers of the body of the rod so that the tension is carried directly to these portions from the straight fibers and they can, in tension, each assume its share of the burden and the ends of the rod thus formed will not tend to be damaged when tension is applied to the connecting fittings or members in the finished product.

After the resin has been set with the fittings in place, the fittings are moved inwardly of the rod to a position similar to that shown in FIG. 1 and adhesive is applied to the portions of the rod which fit within the fittings and the fittings are then moved to the ends of the rods and considerable tension, as much as twenty thousand pounds per square inch, is applied to the fittings tending to pull them apart. The adhesive is preferably mixed with suitable grit to help anchor the fittings in place on the rod.

This operation insures against damage to the ends of the rods when tension is applied later in use which might result from shrinkage in the setting of the resin. It assures that the tapered portions of the rod are seated tightly in the tapered portions of the fittings to assure direct transfer of forces from the rod to the fittings and to guard against damage which might result to the end of the fiber glass tension member, and particularly the tapered ends thereof if they were improperly or incompletely seated when tension is applied in use.

In the finished product the glass fibers between the ends of the tension member extend longitudinally and parallel to one another. The ends are flared out at a gentle angle and the flared portions conform to the fit in the tapered bores and are held in position to transmit tension from the fitting through the tension member by the cured resin and the plugs which hold the ends of the fibers in the flared position and prevent collapse when tension is applied to the fittings. The adhesive holds the fitting in proper position for proper transfer of tension.

The drawings show the method of producing the strain insulator and a form of the strain insulator which is highly desirable. In carrying out the method, a rod 11 is formed of glass fibers. A plurality of such glass fibers, which are indicated at 12 in FIGS. 1 and 2, are coated with a suitable uncured thermo setting resin and while under tension to keep them all straight and parallel to one another are brought into intimate contact with one another and are compacted to rod form and a spiral wrapping 13 of cellophane tape is applied to the surface of the assembled fibers and the uncured resin to maintain the assembly in rod form.

A suitable metallic fitting is provided for each end of the strain insulator. It may be formed of ferrous metal such as steel or malleable iron or the like. Such a fitting is shown in FIGS. 5 and 7 at 14. Each fitting consists of an elongated body portion 15 and it its outer end is provided with a pair of ears or lugs 16 each of which is apertured as indicated at 17 to receive an attaching bolt or shackle. These ears are disposed at the outer or terminal ends 18 of the fittings.

Each of the fittings is provided with a longitudinal central bore 19 which opens at the inner end 20 of the fitting and of a size to snugly fit over the rod 11. Each of these bores is provided with a tapered portion 21 which tapers from the inner end 22 thereof, which is of a size to fit the rod 11, to a larger diameter at the outer end 23 thereof. The tapered portion of the bore serves as a seat for the end of the rod as will be described hereafter.

In making the strain insulator each end of the rod 11, formed of the glass fibers and the uncured resin, is inserted into the inner end 20 of a fitting in the bore 19 thereof and is pushed clear through the outer end of the fitting, as shown in FIG. 1.

Thereafter, the cellophane wrapping is removed from the ends of the rod 11 as indicated in FIG. 3 and a plug 24 is inserted centrally of the end as indicated in FIGS. 2 and 3 to splay out the fibers at the end of the rod 11 to form a tapered portion at the end of the rod. The plug 24 is of a size and configuration to form a tapered end portion 25 on the rod which conforms to the tapered portion 21 of the fitting in the preferred form of the invention. This plug is disposed centrally of the rod and the fibers at the end of the rod are distributed uniformly around the plug so that they will lie between the plug and the walls of the tapered portion 21 of the fitting filling the space between the plug and these walls completely.

In the preferred form of the invention, the plug 24 is provided with a sharp point 26 which facilitates its insertion into the end of the rod and when the portion 21 consists of a straight taper as shown in the drawing, it is preferred to have the plug 24 of such form that the surface of a longitudinal cross section of the portion extending from the outer end 27 of the plug up toward the point 26 is approximately semielliptical in that except for the point 26, the contour from the outer end 27 up toward the point 26 follows the contour of an ellipse, the portion 27 representing a central vertical axis. It will be appreciated, however, that variations from this form can be employed. It being desirable however, to so form the tapered portion of the fitting and the plug that the fibers, which lie between the plug and the walls of the tapered portion, fill the space therebetween.

The plug may be of any suitable material and it has been found that a plug made of resin and glass fiber is desirable because it will be securely anchored in place, as will be described later, when the resin of the rod is set.

After insertion of the plug in the ends of the uncured rod, the fittings 14 are moved outwardly to the position shown in FIG. 5 with the splayed-out fibers of the end of the rod fitting into the tapered portion 21 of the fitting.

Pressure is then applied to the outer end 27 of the plug to seat the splayed-out fibers and the plug in the tapered portion 21 of the fitting, opposing pressure is applied to the fitting sufficient to firmly seat the splayed-out fibers in the fitting.

While maintaining this pressure, the rod and fittings are subjected to heat to cure and set the resin of the rod. The fittings serve as molds and the result is that the ends of the rod are molded and set to a form closely corresponding to the form of the seats formed by the tapered portions 21 of the fittings.

The taper of the tapered portions 21 of the fittings and of the ends of the rods are gentle. They may, for instance, run about 10° as shown in the drawings, although they may vary from this specific taper. Thus the fibers at the end of the rod are not bent abruptly where the taper occurs and since the fibers in the splayed portion of the rod are maintained straight and generally parallel to one another, tension from the straight fibers of the body of the rod is transferred efficiently and effectively. Furthermore, the ends of the rods are seated in such a manner as to substantially eliminate points of stress concentration which might damage the ends of the rod when tension is applied in use.

After the resin has been cured, the fittings are moved inwardly of the ends of the rod to the position shown in FIG. 6. The cellophane wrapping is removed from the rod and particularly the ends thereof which fall within the fittings and adhesive indicated at 28 is applied to the ends of the rods which fall within the fittings. Thereafter, the fittings are moved out to the position shown in FIG. 7 and tension is applied to them to pull them apart and firmly seat the ends of the rod in the seats formed by the tapered portions 21 of the fittings.

Tensions up to two thousand pounds per square inch may be employed although in many cases, tensions of five thousand pounds per square inch will achieve the desired results. The tension applied must be adequate to firmly seat the tapered portions of the ends of the rod in the seats.

By following the procedures described above, it is possible to make sure that any shrinkage of the resin during curing will not adversely affect the rod or make it vulnerable to damage in use when tension is applied to the finished product. The application of the adhesive and tension in seating the ends of the rod in the seats assures intimate contact between the ends of the rods and the seats and eliminates the deleterious effect of any possible high spots and resulting stress concentrations. The fittings are maintained in their proper position for effective transfer of tension from the fittings to the rod.

In making the strain insulator, it is possible to make use of any of the well known resins which are employed in making fiber glass members. Minimum shrinkage is achieved with epoxy resins.

The adhesive employed may be any suitable resin. Epoxy has been proven highly successful and its effectiveness is increased by incorporating grits, such as "Alundum," which is a trademark applied to aluminum oxide, which when tension is applied during the seating of the ends of the rod, tend to bite into both the rot and the fitting.

By employing the procedures described above, there is a minimum loss of resin from the splayed-out portion of the rod during curing while the eventual seating of the ends of the rods in the fittings may be accomplished at tensions which would tend to force resin, liquefied by heating, to run out of the end of the rod.

The resulting product is one in which the glass fibers of the rod all extend straight and parallel to one another so that each can assume its full share of the load. The ends with the gentle taper are seated in such a way that stress concentration points are avoided and the fitting and rod are so intimately joined together that injury through relative movement therebetween is substantially eliminated in the product. It is possible to deform the fittings with excessive tension prior to failure of the fiber glass element.

The above form of the invention is the preferred form and is shown as illustrative of the invention. It will be understood that departures from this exact form can be made without departing from the invention.

The foregoing description is to be considered illustrative, not restrictive. Reference to the appended claim will indicate the scope of the invention.

What is claimed is:

The method of producing a strain insulator comprising forming and compacting a plurality of glass fibers and bonding resin into a straight rod with the glass fibers extending longitudinally and parallel to one another, inserting the ends of said rod each into and through one of a pair of fittings each of said fittings having a bore therethrough opening at its inner end, where it is of a size to fit said rod, and having a portion tapering gently to a larger size toward its outer end, inserting one of a pair of tapered plugs at each end of said rod and centrally of the rod in said fitting in which said end of the rod is inserted and splaying out the fibers at said end of the rod to conform generally to the form of the tapered portion of the bore of the fitting in which said end of the rod is inserted, said plugs being of a size and form, along with the fibers into which they are inserted to fill the tapered portion of the bore in which they lie with the outersplayed fibers in contact with the wall of said tapered portion, sliding the fittings longitudinally so as to interfit the splayed tapered ends of the rod with the tapered portion of the bores of the fittings in which they lie with the splayed-out fibers extending straight and generally parallel to the wall of said tapered portion of the bores in which the said fibers lie, applying pressures to seat said tapered fibers firmly in the tapered portions of the fittings in which they lie so as to conform them exactly thereto and, while maintaining said pressure, setting the resin in said rod and the ends thereof, thereafter moving the fittings inwardly from the ends of the rod, applying adhesive between the fittings and the tapered ends of the rod, and thereafter applying tension to pull said fittings apart and seat them firmly on the tapered ends of the rod, and maintain said tension until the adhesive is set.

References Cited by the Examiner

UNITED STATES PATENTS

| 2,874,937 | 2/1959 | Higgins. |
| 3,085,305 | 4/1963 | Colombet et al. 174—179 X |
| 3,129,282 | 4/1964 | Flynn 174—177 |
| 3,134,164 | 5/1964 | Hocks 174—178 X |

FOREIGN PATENTS

| 620,243 | 5/1961 | Canada. |
| 1,199,703 | 6/1959 | France. |
| 1,234,852 | 5/1960 | France. |

ROBERT K. SCHAEFER, Acting Primary Examiner.

LARAMIE E. ASKIN, Examiner.